Feb. 14, 1961  J. ARTRU ET AL  2,971,833
PROCESS OF MANUFACTURING MAGNESIUM
Filed April 7, 1959
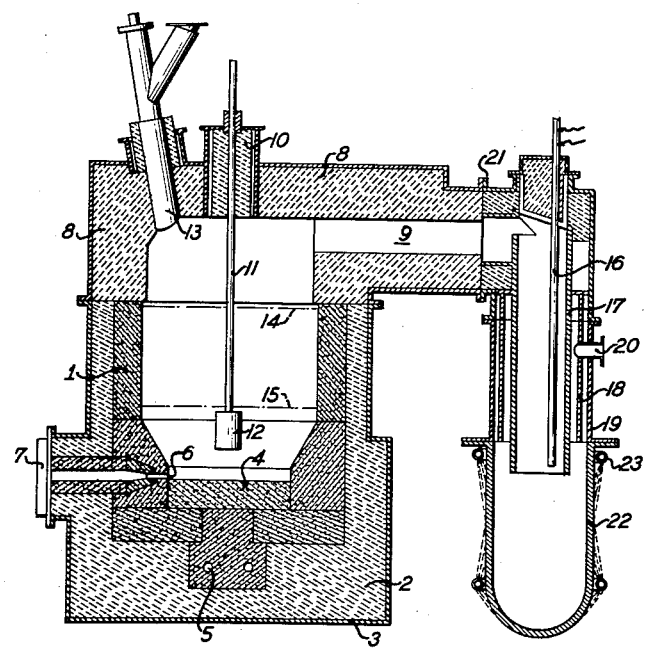
INVENTORS
JEAN ARTRU
JACQUES MARCHAL
BY
ATTORNEY

United States Patent Office 2,971,833
Patented Feb. 14, 1961

2,971,833
PROCESS OF MANUFACTURING MAGNESIUM

Jean Artru, Paris, and Jacques Marchal, Bagneres-de-Bigorre, France, assignors to La Societe dite Le Magnesium Thermique (Magnetherm), Paris, France, a corporation of France Filed Apr. 7, 1959, Ser. No. 804,642
Claims priority, application France Apr. 9, 1958
9 Claims. (Cl. 75—10)

It has already been proposed to carry out the reduction of magnesia, or substances including the same, in an electric furnace containing a slag in a liquid state on the surface of which there is poured the magnesia—or substances including the same—and the selected reducing agent. The required heat is obtained by passing an electric current into the liquid slag, utilizing thereby its electric conductivity at the reaction temperature.

It has been attempted to carry out the reducing reaction on magnesia dissolved in the liquid slag, but there was obtained at the condenser a contaminated metal and a yield which was too small for an industrial process.

More recently, it has been sought to avoid these drawbacks by introducing into the furnace comminuted charges, wherein the reducing agent and the magnesia-containing substance were intimately mixed. These charges were introduced in quantities calculated to solidify partially upon contacting the surface of the slag so as to produce the entire reduction in solid phase in the comminuted mixture. However, a far from negligible quantity of powder was entrained by the magnesium vapor and contaminated the metal in the condenser.

The present invention, which is based on applicants' investigations, relates to an electrothermic process for manufacturing magnesium by the reduction, by means of ferrosilicon, of magnesia, or calcined dolomite, in the midst of a liquid slag of predetermined composition, in such a way as to enable as thorough a utilization as possible of the magnesia dissolved in the slag, while avoiding carbothermic reactions which produce the deposit of impurities in the condenser.

Applicants have established that the addition of alumina, or of a product containing alumina, is indispensable, at least to a certain extent. Such addition makes it possible to obtain a slag which is sufficiently fusible and which reduces the equilibrium temperature of the reaction in consequence of the heat of formation of the silicoaluminate. The reaction is then as follows:

$$2CaO, MgO + (Fe)Si + nAl_2O_3 \rightarrow SiO_2, nAl_2O_3, 2CaO + 2Mg \nearrow$$

The absence or too slight an alumina content in the slag permits one of the following reactions to take place:

$$MgO + C \rightleftarrows Mg \nearrow + CO \nearrow$$
$$SiO_2 + C \rightleftarrows SiO \nearrow + CO \nearrow$$

and, upon cooling at the condenser, there is obtained:

$$Mg + CO \rightarrow MgO + C$$
$$Mg + SiO \rightarrow MgO + Si$$

Hence, the resultant metal is contaminated with magnesia, carbon and silicon.

According to the present invention, the composition of the charge is controlled in such a way as to obtain a slag corresponding to the following molecular ratios:

$$\frac{CaO}{SiO_2} \geq 1.8$$

$$\frac{Al_2O_3}{SiO_2} \geq 0.26$$

By using a reaction temperature of about 1500° C., and a pressure ranging between 5 and 20 millimeters' mercury, it is possible thereby to reduce the residual magnesia content in the liquid slag to about 3% without producing the formation of undesirable deposits at the condenser.

As reducing agent there is used ferrosilicon containing 70–80 percent Si or else, a silicon having a purity in excess of 97%, which introduces less iron. There can also be used an aluminum-ferrosilicon. Care is taken to avoid that the silicon content of the residual ferrosilicon drop below the composition FeSi, that is to say, below 33.5% silicon.

To continue the reduction, it would be necessary to raise the temperature, which would produce secondary reactions inasmuch as carbothermic reactions can then take place.

The presence of alumina in the slag also avoids the formation of SiO through reduction of SiO₂ by silicon.

The alumina can be replaced, in whole or in part, by clay and the addition, when necessary, of a flux for example, fluorspath, to lower the melting point of the slag.

The liberated (elaborated) magnesium is passed to a condenser, arranged in such a fashion as to permit condensation of the magnesium in a liquid state and its dripping and collection in a crucible wherein it can be maintained in a liquid state; however, according to a preferred embodiment of the present invention, this crucible is cooled in such a way that the magnesium contained therein is in the solid state. A better condensation yield is obtained thereby.

When the raw materials (calcined or sintered—fritted—dolomite and ferrosilicon) are introduced as particles (grains) into the slag, the reaction takes place in liquid phase. Hence, the dolomite and the reducing agent are introduced in the form of grains or particles 2 to 20 mms. in size, preferably, from 5 to 15 mm.

The calcined or sintered dolomite absorbs CO₂ and moisture during its cooling and storage. At the time when the particles are charged onto the liquid slag at 1500° C., there is produced a violent liberation of gas which entrains particles of the reducing metal into the condenser and, as a result, the magnesium becomes contaminated. Accordingly, it is preferable to carry out the introduction of the raw material in two stages: in the first stage, the calcined dolomite and the alumina (introduced in its commercial form) are dissolved in the slag; and, in the second stage, the addition of ferrosilicon produces the liberation of the magnesium. Further, all of the materials can be introduced simultaneously if the precaution be taken to use the hot dolomite as it leaves the calcination or sintering furnace without permitting it to cool, for example, below 800° C.

A three-phase or single-phase reduction furnace can be used. The single-phase construction is the simplest and most economical for units having a production capacity of 1 ton per day. The bed of the furnace, of amorphous carbon, then constitutes one of the electrodes. Another removable (interchangeable) electrode faces the bed.

The condensing chamber is removable and comprises both the condenser itself and the crucible for receiving the liquid magnesium. Electric resistance heaters are provided for the condenser.

The annexed drawing represents a schematic sectional view of an embodiment of a satisfactory form of furnace adapted for use with the present invention. In the drawing 1 designates the lateral carbon lining; 2 is a refractory heat insulating lining; 3 is an external tight casing of sheet steel; 4 designates the bed of carbon and 5 the current outlet; 6 is the taphole which enables the periodic removal of ferrosilicon low in residual silicon and the excess liquid slag. When the furnace is in operation, this taphole is closed tightly by means of a device 7.

The roof comprises an insulating and heat-insulating lining 8. The opening 9 of large cross-section constitutes a duct permitting the magnesium vapors to flow towards the condensing chamber. The axial socket 10 permits passage of the vertical electrode 11, constituted of a graphite sleeve 12 which is always immersed in the liquid slag and disposed at the end of a copper tube provided with water circulation. Three ducts 13 permit the introduction of the reactants. 14—14 is the maximum upper level of the liquid slag, while 15—15 designates the minimum lower level of the same slag.

The condensing chamber comprises two principal parts: the condenser proper and the crucible for receiving the magnesium.

The condenser comprises, from the inside out, an electric resistor 16, a sheet steel sleeve 17, a sheet steel sleeve 18 carrying the suction manifold 20 of the vacuum pump, and a sheet steel sleeve 19 which is vacuum tight and which forms the outer wall of the condenser.

The electric resistor is removable and constitutes the upper closure of the condenser. The condenser assembly is formed of two demountable parts to enable cleaning thereof.

Connection to the furnace is by means of a collar or flange 21 provided with a circulating cooling water system; this is also the case of all flanges of the furnace.

Thermoelectric couples (not shown) enable the measurement of the temperature at various spots which are maintained at predetermined values by means of suitable temperature regulators (not shown).

The receiving crucible receives the liquid magnesium condensed on the wall 17. The crucible 22 formed of welded sheet steel is cooled, for example, by means of water sprays 23.

The electric supply comprises a transformer-autotransformer assembly, which permits a continuous variation of the voltage (or intermittent variation at very small intervals). This arrangement is indispensable for controlling the power to the furnace at any instant and thereby, for controlling the course of the reaction for the liberation of magnesium.

Example 1

The level of the slag in the reduction furnace having been brought back to its lower level 15—15, following the tapping of the slag after the preceding operation, the condensing chamber is connected to the furnace.

The assembly of reduction furnace and condensing chamber is then subjected to a partial vacuum. During this evacuation—gas removal from the material—the sleeve 17 of the condenser itself is raised to a temperature of 675° C., and is then maintained at this temperature by means of a regulator (not shown) which operates on the electric resistor 16.

The magnesium receiving crucible 22 is cooled by water sprays 23.

When the temperature of the slag in the reduction furnace reaches 1500° C. and the pressure has been regulated to 10 mm. mercury, the reactants are charged to the furnace.

Prior to charging of the raw materials, the slag has the following composition:

|  | Percent |
| --- | --- |
| CaO | 54.5 |
| $SiO_2$ | 28.2 |
| $Al_2O_3$ | 15.0 |
| MgO | 2.3 |

The reaction mixture has the following composition:

Ferrosilicon—particles 5–15 mm. in size containing 80% Si=14%

Calcined dolomite—particles 5–15 mm. in size containing 37% MgO=77%

Powdered alumina=9%

The supply hoppers, three in number, contain altogether 15,000 kg. of reaction mixture, to wit:

In the first hopper: 2100 kg. ferrosilicon having a Si content of 80%
In the second hopper: 11,550 kg. of calcined dolomite having an MgO content of 37%
In the third hopper: 1350 kg. alumina Each hopper is subjected to a vacuum of 10 mm. Hg and is provided with an automatic, sealed feed system which enables the introduction into the furnace of the various raw materials, either simultaneously or successively at the desired rate. For example, in the example selected there was introduced at time zero, 13.5 kg. alumina and 115.5 kg. calcined dolomite. At the end of 6 minutes, 10.5 kg. of ferrosilicon of 80% silicon content, then, 3 minutes later, again 10.5 kg. of ferrosilicon of 80% silicon content.

The automatic feeding system makes it possible to repeat this succession of operations every 12 minutes.

When half the charge has been introduced into the furnace, the feed is stopped. The furnace is then again placed under atmospheric pressure by the introduction of a neutral (inert) gas, for example, argon. The slag which has attained the level of 14—14 in the furnace is then brought back to the level 15—15 by boring a taphole 6.

The residual ferrosilicon is then removed simultaneously with the slag and is separated from the latter. The residual ferrosilicon can be utilized, for example, as a deoxidizer for steel.

The furnace-condenser assembly, maintained under an argon atmosphere during tapping of the slag is then again placed under vacuum and the second part (stage) of the operation is started.

The supply of the raw materials takes place at the same rate as during the first part of the run (operation).

At the end of 22 hours, the reduction operation is completed, the furnace is again placed under atmospheric pressure, the condensing chamber is removed from the furnace and is dismounted into its parts. The residual ferrosilicon and the excess slag are removed through the opening 6 as after the first part of the operation.

The crucible 22 which contains all of the magnesium condensed as a liquid on the wall 17, or as a solid in the crucible itself, is transferred to the foundry where the magnesium is refined and cast into ingots.

There is obtained 2050 ks. of ingot magnesium which represents a yield of 85%.

For the entire operation there is obtained on the one hand about 11,850 kgs. of slag with an MgO content of 2.3%, and, on the other hand, 885 kgs. of residual ferrosilicon with a silicon content of 35%.

A condensing chamber is replaced on the furnace. The furnace is placed under vacuum, the mixture is refilled into the supply hoppers, and a new run is started.

The total time between the start of the two runs is 24 hours. The production of the furnace amounts to 2 tons per day.

Example 2

The operation is carried out in the same way as in Example 1, but the alumina of the charge is introduced entirely before the beginning of each semi-run while the furnace is being placed under vacuum.

The calcined dolomite and the 80% ferrosilicon are introduced at the rate indicated in Example 1.

There is obtained thereby a magnesium having very low contents of silicon and aluminum.

The metal obtained by the process of the present invention has the following composition:

| | Percent |
|---|---|
| Silicon | 0.005 to 0.020 |
| Aluminum | 0.004 to 0.010 |
| Iron | 0.002 to 0.015 |
| Manganese | 0.01 to 0.1 |
| Magnesium | 99.97 to 99.85 |

The manganese is derived from the dolomite used in the operation.

The examples set out above are merely given by way of illustration of the invention and not by way of limitation.

According to the foregoing process the reaction temperature is within the range of 1300° C. to 1700° C. and the pressure is higher than 1.5 millimeters of mercury.

We claim:

1. A process for producing magnesium by the reduction of a substance comprising magnesia by a metallic reducing agent, comprising the steps of: dissolving said substance in a liquid slag consisting essentially of lime, silica and alumina, wherein the following molecular ratios hold true:

$$\frac{\text{Number of molecules CaO}}{\text{Number of molecules SiO}_2}$$

is at least 1.8, and $$\frac{\text{Number of molecules Al}_2\text{O}_3}{\text{Number of molecules SiO}_2}$$

is at least 0.26, dispersing said metallic reducing agent in said liquid slag and heating said slag by electric current flowing between carbon electrodes in contact with said slag and said magnesia, thereby producing and evaporating magnesium metal while avoiding the formation of carbon monoxide.

2. Process according to claim 1, wherein the charge supplied to the liquid slag consists of calcined dolomite, alumina, and ferrosilicon having a silicon content greater than about 70%.

3. Process according to claim 1, wherein the process is carried out in an electric furnace at a temperature of about 1500° C. and at a pressure of within the range of 5–20 mm. Hg, and the liquid slag is in contact with a carbon bed.

4. Process according to claim 1, wherein magnesium is liberated in the form of vapors, the vapors are condensed to the liquid state, the liquid magnesium drains into a cooled receiver and is solidified therein.

5. Process according to claim wherein the reaction temperature is within the range of 1300° C. to 1700° C. and the pressure is higher than 1.5 millimeters of mercury.

6. Process according to claim 2, wherein the dolomite and the ferrosilicon consist of particles 2 to 20 mm. in size.

7. Process according to claim 2, wherein the dolomite and the ferrosilicon consist of particles 5 to 15 mm. in size.

8. Process according to claim 2 wherein first, the calcined dolomite at substantially ambient temperature is charged to the liquid slag and, thereafter, the ferrosilicon.

9. Process according to claim 2, wherein the dolomite is freshly calcined and at a temperature of about 800° C., and all the reactants are charged simultaneously to the liquid slag.

References Cited in the file of this patent

UNITED STATES PATENTS

| 2,847,295 | Bretschneider | Aug. 12, 1958 |

FOREIGN PATENTS

| 727,038 | Great Britain | Mar. 30, 1955 |

UNITED STATES PATENT OFFICE
CERTIFICATION OF CORRECTION

Patent No. 2,971,833            February 14, 1961

Jean Artru et al.

It is hereby certified that error appears in the above numbered patent requiring correction and that the said Letters Patent should read as corrected below.

Column 4, line 64, for "ks." read -- kgs. --; column 6, line 18, after "claim" insert -- 1 --.

Signed and sealed this 4th day of July 1961.

(SEAL)

Attest:

ERNEST W. SWIDER
Attesting Officer

DAVID L. LADD
Commissioner of Patents